(12) United States Patent
Atreya et al.

(10) Patent No.: US 8,127,758 B2
(45) Date of Patent: Mar. 6, 2012

(54) SOLAR-THERMAL FLUID HEATING FOR AEROSPACE PLATFORMS

(75) Inventors: Shailesh Atreya, Irvine, CA (US); Michael F. Stoia, Rancho Santa Margarita, CA (US); Tina R. Stoia, Rancho Santa Margarita, CA (US); Russell K. Jones, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 1001 days.

(21) Appl. No.: 12/058,650

(22) Filed: Mar. 28, 2008

(65) Prior Publication Data
US 2009/0242420 A1    Oct. 1, 2009

(51) Int. Cl.
*F24J 2/38* (2006.01)
*F24J 2/04* (2006.01)
*C25B 9/00* (2006.01)

(52) U.S. Cl. ........ 126/573; 126/600; 126/678; 126/569; 126/634; 126/705; 126/714; 701/222; 701/213; 701/214; 136/201; 136/206; 136/244; 136/254; 204/252; 204/263; 204/265; 204/266

(58) Field of Classification Search .............. 136/201, 136/206, 244, 254; 701/213, 214, 222; 126/569, 126/573, 600, 621, 628, 634, 640, 678, 701, 126/704, 705, 714; 204/252, 263, 265, 266
See application file for complete search history.

(56) References Cited

U.S. PATENT DOCUMENTS

| | | | | |
|---|---|---|---|---|
| 3,925,212 | A | * 12/1975 | Tchernev | 422/186 |
| 4,364,375 | A | * 12/1982 | Younghouse | 126/666 |
| 5,658,448 | A | 8/1997 | Lasich | |
| 2005/0242232 | A1* | 11/2005 | Bennett | 244/53 R |
| 2006/0048808 | A1* | 3/2006 | Ruckman et al. | 136/206 |
| 2007/0084502 | A1* | 4/2007 | Kelly et al. | 136/246 |
| 2007/0116996 | A1* | 5/2007 | Pavlik et al. | 429/21 |

* cited by examiner

*Primary Examiner* — Bruce Bell

(57) ABSTRACT

An aerospace platform includes a structure having a cavity and a light-transmissive portion that exposes the cavity to sunlight. The aerospace platform further includes a fluid heating system. The fluid heating system includes a fluid-carrying, thermally absorptive structure within the cavity, and a solar collector for collecting light transmitted through the light-transmissive portion and focusing the collected light onto the absorptive structure. The thermally absorptive structure has a high surface absorptivity that retains thermal energy when exposed to solar irradiance and heats fluid contained therein.

24 Claims, 3 Drawing Sheets

SOLAR-THERMAL FLUID HEATING FOR AEROSPACE PLATFORMS

BACKGROUND

A platform such as a spacecraft, lunar base, or long endurance airborne vehicle might require in-situ gas generation to support propulsion, life support, and/or electrical power systems. An energy efficient means of in-situ gas generation would be beneficial to a range of aerospace platforms.

SUMMARY

According to an embodiment of the present invention, an aerospace platform includes a structure having a cavity and a light-transmissive portion that exposes the cavity to sunlight. The aerospace platform further includes a fluid heating system. The fluid heating system includes a fluid-carrying, thermally absorptive structure within the cavity, and a solar collector for collecting light transmitted through the light-transmissive portion and focusing the collected light onto the absorptive structure. The thermally absorptive structure has a high surface absorptivity that retains thermal energy when exposed to solar irradiance and heats fluid contained therein.

According to another embodiment, a system for an aerospace platform includes a water-carrying, thermally absorptive container within the cavity, and a solar collector for collecting solar irradiance transmitted through a window of the platform and focusing the collected solar irradiance onto the thermally absorptive container. The thermally absorptive container has high surface absorptivity that retains thermal energy when exposed to solar irradiance and heats water contained therein. The system further includes an electrolyzer for breaking down the heated water into oxygen and hydrogen.

According to another embodiment, a method includes flowing water into an absorptive container having a line of sight to a light-transmissive section of an aerospace platform, and heating the water in the container to produce steam. The water is heated by collecting solar irradiance transmitted by the light-transmissive section and focusing the collected solar irradiance onto the container. The method further includes performing high temperature electrolysis to produce hydrogen and oxygen from the steam.

DETAILED DESCRIPTION

Figure 1:
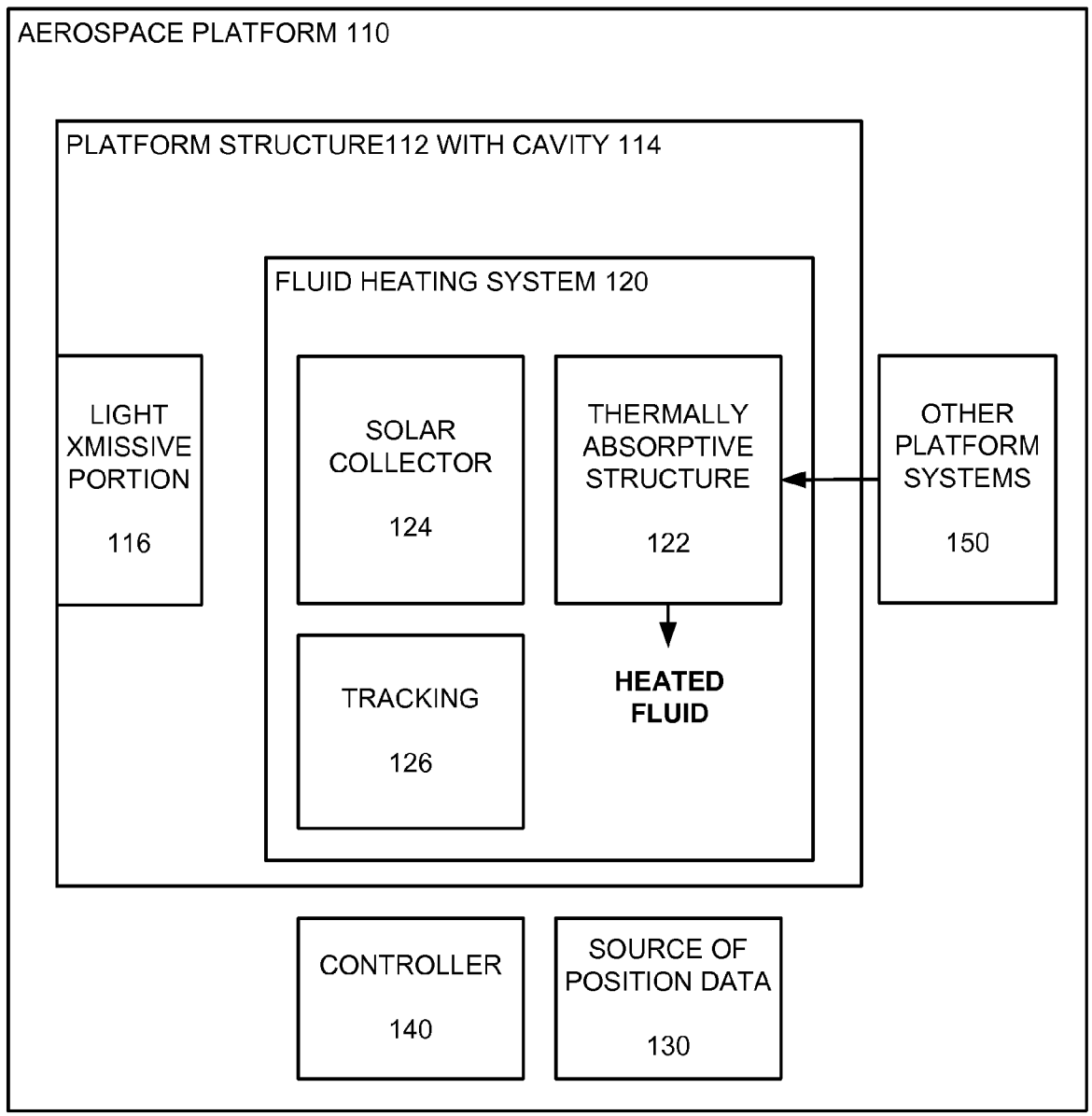
FIG. 1 is an illustration of an aerospace platform in accordance with an embodiment of the present invention.

Reference is made to FIG. 1, which illustrates an aerospace platform 110. The aerospace platform 110 includes a structure 112 having a cavity 114 and a light-transmissive portion 116 that exposes the cavity 114 to solar irradiance. The light-transmissive portion 116 may be a window. For an aerospace platform 110 such as an airborne vehicle, the structure 112 may be, without limitation, a fuselage, empennage, wing, boom or nose. For an aerospace platform 110 such as a spacecraft, the structure 112 may be, without limitation, a body, boom, or array.

The light-transmissive portion 116 has a high transmissivity (i.e., it transmits solar irradiance with minimal loss). The transmissivity may be in the range of 0.5 to 1.0. A transmissivity of 0.85 or higher is preferred. The light-transmissive portion 116 may be made of glass, crystalline solids (e.g., $Al_2O_3$ (Sapphire), $CaF_2$ (Calcium Fluoride), $MgF_2$ (Magnesium Fluoride), quartz), a polymer (e.g., Polyethylene Terephthalate, Polymethyl Methacrylate, Polystyrene), or other suitable materials.

The aerospace platform 110 further includes a fluid heating system 120 for using solar-thermal energy to heat a working fluid (e.g., water). In some embodiments, the heating system 120 evaporates the working fluid. The fluid heating system 120 includes a fluid-carrying, thermally absorptive structure 122. For example, the structure 122 may be a vacuum-jacketed tube for holding the working fluid.

The fluid heating system 120 further includes a solar collector 124 for collecting light transmitted through the light-transmissive portion 116 and focusing the collected light onto the thermally absorptive structure 122. A solar collector 124 having a concentration ratio of one or greater is desirable. In some embodiments, the solar collector 124 may include a Fresnel lens. In other embodiments, the solar collector 124 may include a reflective trough or parabolic dish.

The thermally absorptive structure 122 has high surface absorptivity (i.e. absorbs most incident solar irradiance). The absorptivity should be greater than 0.7. An absorptivity of greater than 0.9 is desirable. A black chromed metal tube can achieve an absorptivity of greater than 0.9. The thermally absorptive structure 122 absorbs the solar energy and transfers it to the working fluid contained within. The transferred energy heats and/or vaporizes the fluid within the thermally absorptive structure 122.

In some embodiments, the fluid heating system 120 may include a tracking system 126 for causing the solar collector 124 to track the Sun so the solar collector 124 can maximize the capture of incident solar irradiance. For example, the solar collector 124 can be mounted on gimbals, which are driven by motors. The platform's position data can be determined from a source 130 such as a GPS, differential GPS, a celestial body tracker (e.g., a star tracker), etc.

A controller 140 determines relative position of the Sun using pre-programmed and/or sensed data, and steers the solar collector 124 to maximize incident solar irradiance. The amount of heat transferred to the working fluid within the collector 124 can be tailored by adjusting fluid mass flow rate through the thermally absorptive structure 122 or by purposefully misaligning the solar collector 124 with the Sun.

In other embodiments, solar tracking is not performed. Advantages of non-tracking embodiments include greater reliability because fewer moving parts (motors, gears, gimbals, etc.) are involved; and lower power consumption because motors don't have to be driven. A non-tracking embodiment could rely upon vehicle motion (e.g. rolling) or a larger absorptive structure to collect solar irradiance and heat the working fluid.

Concentration of light is accomplished by accurate pointing of the collector 124. A solar collector having a concentration ratio of one or greater allows for sufficient concentration of light, with or without solar tracking.

To augment the heating of the working fluid, waste heat from other platform systems 150 can be captured and transferred to the working fluid using auxiliary heat exchangers. The other platform systems 150 may include, without limitation, fuel cells, electrolyzers, on-board electronics, solar cells, auxiliary power units, and engines.

Although FIG. 1 shows a solar collector 124 that is a discrete element, an embodiment of the present invention is not so limited. In some embodiments, the solar collector 124 may be integrated with the light-transmissive portion 116. As a first example, a Fresnel lens is formed inside the cavity 114 on the light-transmissive portion 116. As a second example, a diffractive grating is etched on the light-transmissive portion 116. As a third example, a lens is bonded directly to the light-transmissive portion 116.

In other embodiments, interior surfaces of the aerospace platform 110 can be made of, or coated with, a reflective material, and these surfaces can be formed with a shape that focuses incident solar irradiance onto the thermally absorptive structure 122. Incident solar irradiance transmitted through the light-transmissive portion 116 is reflected by the interior surfaces within the aerospace platform 110 and directed onto the thermally absorptive structure 122. In these embodiments, the aerospace platform 110 can be maneuvered (e.g., rolled) in order to align the light-transmissive portion 116 with the Sun.

The aerospace platform 110 of FIG. 1 is not limited to any particular platform. Examples of aerospace platforms include, but are not limited to, a spacecraft, lunar base, and long endurance airborne vehicle.

The fluid heating system 120 is not limited to any particular application. The heated fluid can be broken down into its molecular constituents through electrolysis to support a variety of platform applications. Examples of such applications include, but are not limited to, in-situ gas generation to support propulsion (e.g., generation of gaseous hydrogen for fuel), life support (e.g., generation of gaseous oxygen for breathing), and electrical power systems (e.g., generation of gaseous hydrogen and oxygen for a fuel cell).

Figure 2:
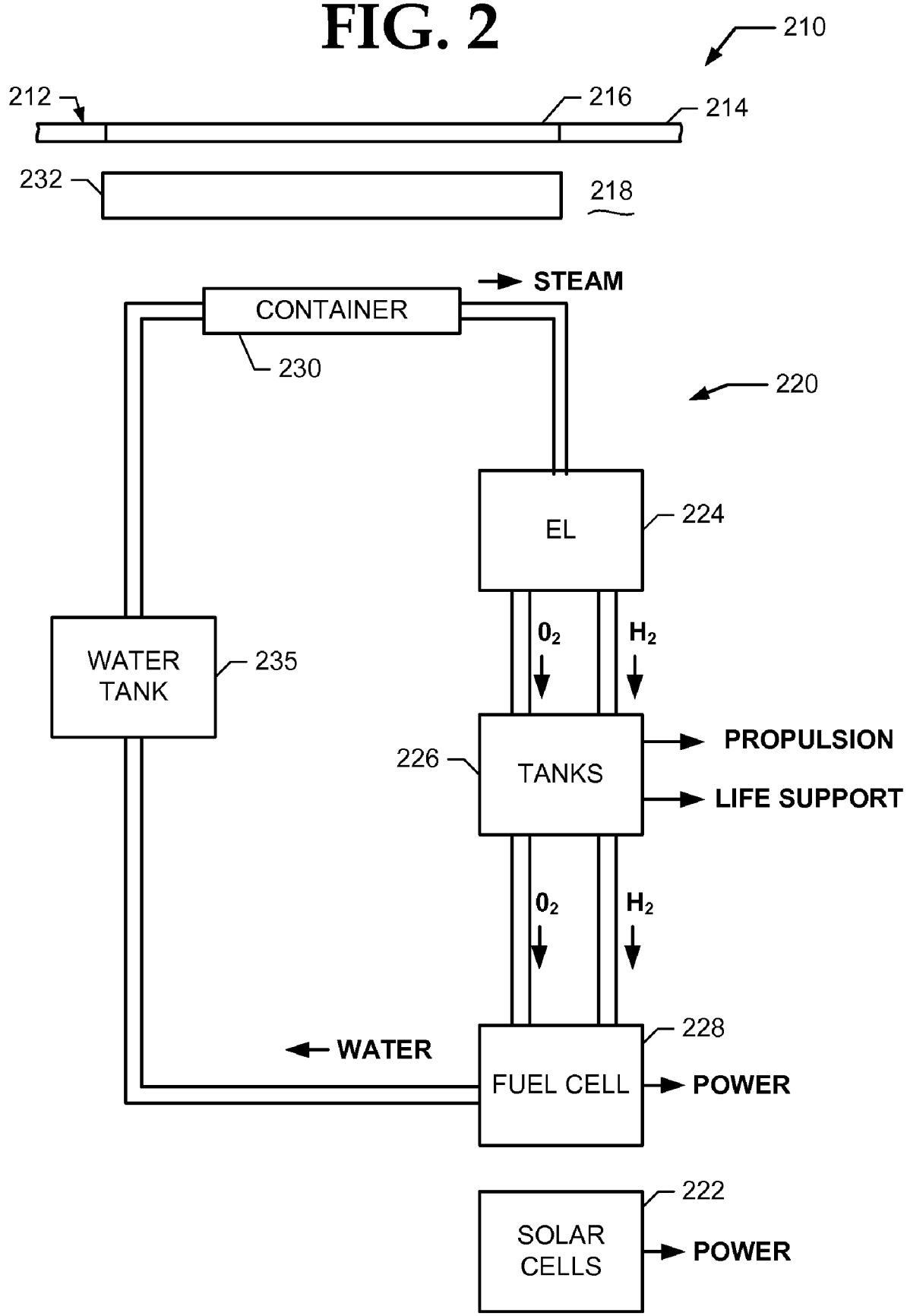
FIG. 2 is an illustration of a system in accordance with an embodiment of the present invention.

Reference is made to FIG. 2, which illustrates a portion of a long endurance space or near-space (i.e. high altitude) platform 210. The platform 210 is designed to operate above cloud cover, so obscuration of the Sun is largely mitigated. In addition, the platform 210 is designed to operate over an extended duration of time without maintenance or resupply.

The platform 210 includes a body 212 having a skin 214. A light-transmissive window 216 in the body 212 is made of a material such as polyethylene terephthalate (PET). A desirable characteristic of the PET is that it has a density that is comparable to external skin materials such as Mylar™. This minimizes the weight impact of replacing the body skin with the light-transmissive window 216.

The platform 210 includes an electrical power system 220 for providing continuous electrical power to the platform 210 during the duration of its mission. The electrical power system 220 may include photovoltaic cells 222 for converting sunlight to electrical power. These solar cells 222 may be mounted to platform locations that are exposed to sunlight.

The electrical power system 220 further includes an electrolyzer (EL) 224 for breaking down the heated water or steam into hydrogen and oxygen. Preferably, the water is evaporated, and the electrolyzer 224 is a high temperature electrolyzer that breaks down steam into hydrogen and oxygen.

Tanks 226 store the hydrogen and oxygen. The tanks 226 may be composite overwrapped pressure vessels.

A fuel cell 228 converts the stored hydrogen and oxygen into electrical power. The fuel cell 228 is not limited to any particular type. The fuel cell 228 could be, without limitation, a proton exchange membrane fuel cell, or a sold oxide fuel cell. An outlet of the fuel cell 228 provides water. In some embodiments, the fuel cell 228 may be integrated with the electrolyzer 224.

A thermally absorptive container 230 is in fluid communication with a steam inlet of the electrolyzer 224 via a water tank or condenser 235. The thermally absorptive container 230 is located inside a cavity 218 of the body 212, with a line of sight to the light-transmissive window 216. The thermally absorptive container 230 may be vacuum jacketed to minimize heat losses to the environment. However, the thermally absorptive container 230 is not limited to vacuum jacketing. Heat loss may be minimized in other ways.

A solar collector 232 collects solar irradiance transmitted through the light-transmissive window 216 and focuses the collected solar irradiance onto the thermally absorptive container 230. Water inside the thermally absorptive container 230 is heated and supplied to an inlet of the electrolyzer 224. Molecular components of the heated water, namely hydrogen and oxygen, are generated by the electrolyzer 224

Figure 3:
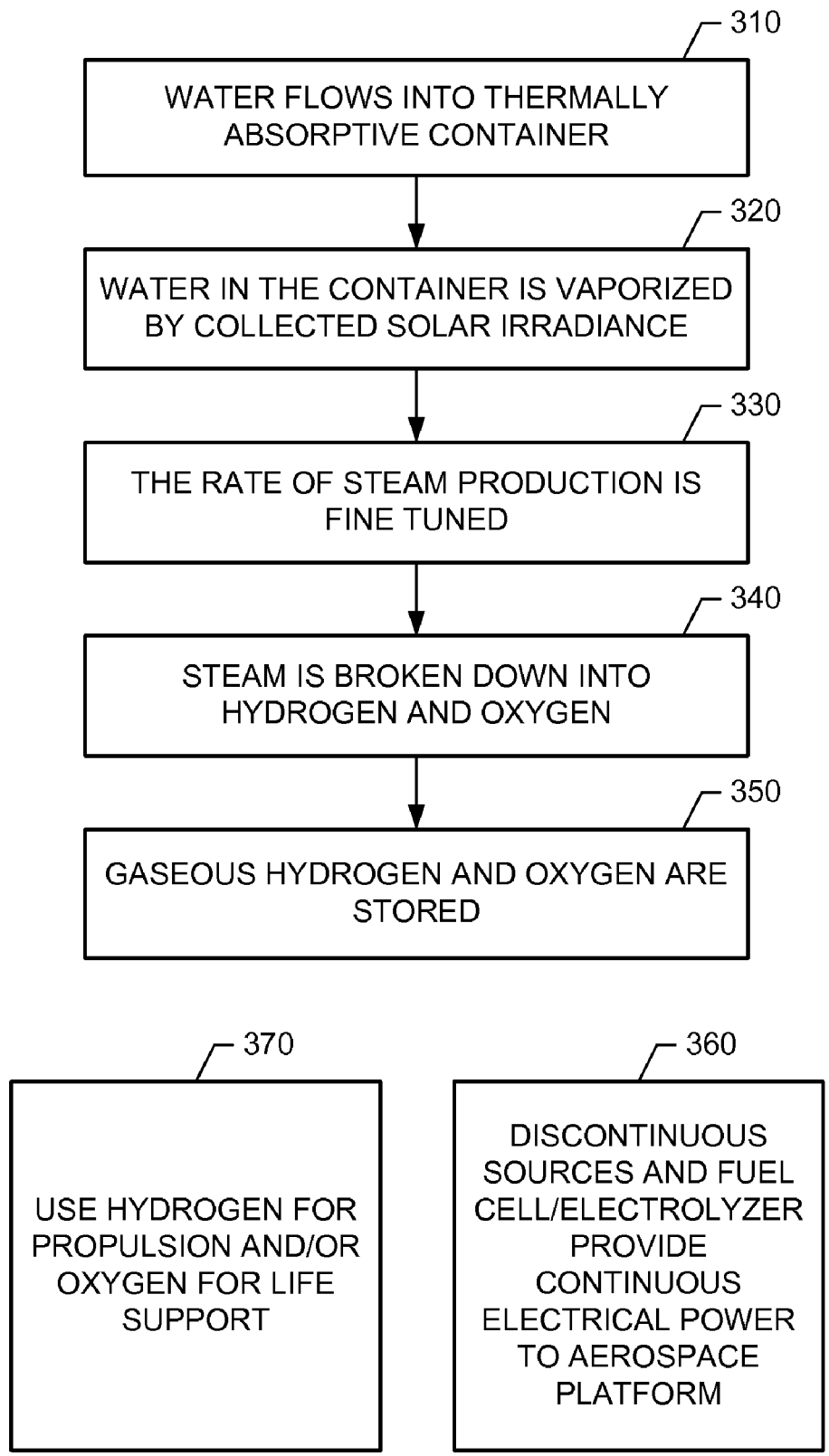
FIG. 3 is an illustration of a method in accordance with an embodiment of the present invention.

Additional reference is made to FIG. 3, which illustrates a method of using an electrical power system 220 of FIG. 2. At block 310, water flows into the thermally absorptive container. At block 320, the water in the container is vaporized by collecting solar irradiance transmitted through the light-transmissive window and focusing the collected irradiance onto the container.

The rate of steam production is designed into the system through the selection of mass flow rate ranges and absorber container/tank dimensions. At block 330, the rate of steam production can also be fine tuned through the alignment, or purposeful misalignment, of incident solar irradiance with the thermally absorptive container. Perfect alignment gives maximum heating. Misalignment can be intentionally introduced to reduce the heating rate of the water. An active control system (e.g., a part of the system that controls the collector tracking) can ensure delivery of steam at the appropriate thermodynamic state (i.e., pressure, temperature, and quality).

At block 340, the steam is broken down into hydrogen and oxygen. At block 350, gaseous hydrogen and oxygen are stored in the tanks for later use.

Thus far, sunlight is converted to thermal energy, and the thermal energy is used to produce hydrogen and oxygen from steam through electrolysis. While the functions at blocks 310-350 are being performed, solar cells are collecting solar irradiance and producing electrical power (block 360).

A product of the fuel cell, namely water, will be converted back into steam when solar-thermal energy is available. Little water is lost as water is converted to steam, steam is converted to hydrogen and oxygen, and hydrogen and oxygen are converted back to water. A small reserve of water may be kept if there is no chance of replenishing the water during a long endurance mission. Some applications may capture water from surrounding air in lieu of carrying 100% of the required water on-board.

The electrical power system 220 is a closed loop regenerative system. Discontinuous power sources, such as solar cells are combined with a fuel cell and electrolyzer to provide continuous electrical power (block 360). In this capacity, the fuel cell and electrolyzer perform power storage and generation functions. The closed loop system generates electrical power continuously over a long duration. It does not consume energy from other systems of the aerospace platform.

The solar-thermal conversion system reduces or eliminates electrical demands for gas generation on the aerospace platform. Thus, it frees up more power for other systems or can be used to downsize the electrical system. Moreover, the solar-thermal gas generation is expected to have a conversion efficiency of better than 70% as compared to a solar-electric process, which has a conversation efficiency of up to 35%.

Steam generation lends itself to long endurance missions because long-term storage of steam is not practical. Water is stored in a liquid state, which is more desirable due to improved packaging (e.g., higher density) and less demanding thermal management and pressure regulation systems.

At block 370, the stored hydrogen and oxygen can be used for functions other than electrical power generation. For example, the stored oxygen gas can be used for life support, and the stored hydrogen gas can be used as fuel by a propulsion system.

The invention claimed is:

1. An aerospace platform comprising:
    a platform structure having a cavity and a light-transmissive portion that exposes the cavity to sunlight; and
    a fluid heating system including:
        a fluid-carrying, thermally absorptive structure within the cavity;
        a solar collector for collecting solar irradiance transmitted through the light-transmissive portion and focusing the collected solar irradiance onto the thermally absorptive structure; and
        means for moving the solar collector to track the Sun;
        the thermally absorptive structure having high surface absorptivity that retains thermal energy when exposed to solar irradiance and heats water contained therein.

2. The platform of claim 1, wherein the light-transmissive portion has a transmissivity of at least 0.85.

3. The platform of claim 1, wherein the light-transmissive portion and the solar collector are integrated.

4. The platform of claim 1, wherein the solar collector is integrated with the platform structure.

5. The platform of claim 1, wherein the thermally absorptive structure includes a vacuum jacketed container.

6. The platform of claim 1, further comprising an electrolyzer for breaking down the heated water into molecular components.

7. The platform of claim 3, wherein the thermally absorptive structure evaporates the water; and wherein the electrolyzer breaks down steam into hydrogen and oxygen.

8. The platform of claim 6, wherein the electrolyzer breaks down heated water into hydrogen and oxygen.

9. The platform of claim 8, further comprising a fuel cell for generating electrical power from the hydrogen and oxygen; wherein the thermally absorptive structure is in fluid communication between a water outlet of the fuel cell and a steam inlet of the electrolyzer.

10. The platform of claim 9, further comprising solar cells for providing electrical power to the platform, wherein the combination of the solar cells and fuel cell provides continuous electrical power to the platform.

11. The platform of claim 8, further comprising a life support system for using gaseous oxygen produced by the electrolyzer.

12. The platform of claim 8, further comprising a propulsion system for using gaseous hydrogen produced by the electrolyzer.

13. The aerospace platform of claim 1, wherein the platform structure includes one of a fuselage, empennage, wing, aircraft boom, aircraft nose, spacecraft body, spacecraft boom, and spacecraft array.

14. A system for generating gaseous oxygen and hydrogen for an aerospace platform having a window that transmits solar irradiance, the system comprising:
    a water-carrying, thermally absorptive container within the cavity;
    a solar collector, having a line of sight to the window, for collecting solar irradiance transmitted through the window and focusing the collected solar irradiance onto the thermally absorptive container, the thermally absorptive container having high surface absorptivity that retains thermal energy when exposed to solar irradiance and heats water contained therein to produce steam; and
    an electrolyzer for performing high temperature electrolysis to break down the steam into oxygen and hydrogen.

15. The system of claim 14, further comprising a fuel cell for generating electrical power from the hydrogen and oxygen; wherein the thermally absorptive container is in fluid communication between a water outlet of the fuel cell and a water inlet of the electrolyzer.

16. The system of claim 14, further comprising a means for moving the solar collector to track the Sun.

17. A method for an aerospace platform, the method comprising
    flowing water into an absorptive container having a line of sight to a light-transmissive section of the aerospace platform;
    heating the water in the container to produce steam, the water heated by collecting solar irradiance transmitted by the light-transmissive section of the aerospace platform, and focusing the collected solar irradiance onto the container; and
    performing high temperature electrolysis to produce hydrogen and oxygen from the steam.

18. The method of claim 17, further comprising using a fuel cell to produce electrical power from the hydrogen and oxygen, wherein water produced by the fuel cell is flowed into the absorptive container.

19. The method of claim 17, further comprising using solar cells in combination with the fuel cell to provide continuous electrical power to the platform.

20. The method of claim 17, wherein a solar collector is used to collect and focus the solar irradiance, and wherein collecting the solar irradiance includes moving the solar collector to track the Sun.

21. The method of claim 20, wherein misalignment with the Sun is intentionally introduced during tracking to reduce heating rate of the water.

22. The method of claim 17, further comprising operating the aerospace platform above cloud cover.

23. The method of claim 17, further comprising using gaseous oxygen produced by the electrolyzer for life support aboard the aerospace platform.

24. The method of claim 17, further comprising supplying gaseous hydrogen produced by the electrolyzer to a propulsion system of the aerospace platform.

* * * * *